May 12, 1925.  
E. J. GOULD  
AUXILIARY TRANSMISSION GEAR  
Filed June 25, 1924

1,537,434

2 Sheets-Sheet 1

Edwin J Gould  
INVENTOR

May 12, 1925.　　　　　　　　　　　　　　1,537,434
E. J. GOULD
AUXILIARY TRANSMISSION GEAR
Filed June 25, 1924　　　　2 Sheets-Sheet 2

Edwin J. Gould
*INVENTOR*

Patented May 12, 1925.

1,537,434

UNITED STATES PATENT OFFICE.

EDWIN J. GOULD, OF OAKLAND, CALIFORNIA, ASSIGNOR TO CONSOLIDATED CONTROLS CORPORATION, OF OAKLAND, CALIFORNIA, A CORPORATION OF CALIFORNIA.

AUXILIARY TRANSMISSION GEAR.

Application filed June 25, 1924. Serial No. 722,359.

*To all whom it may concern:*

Be it known that I, EDWIN J. GOULD, a citizen of the United States, residing at Oakland, county of Alameda, State of California, have invented certain new and useful Improvements in Auxiliary Transmission Gears, whereof the following is a specification.

This invention is an improved auxiliary transmission gear designed to be attached directly to the differential gear of a motor vehicle, and has for its object the reduction of the speed of the rear axle by one half, and the consequent increase of the driving power a like amount, or by interlocking, drive at the original speed, also to cheapen the cost and increase the strength of this type of mechanism.

Figure 1:
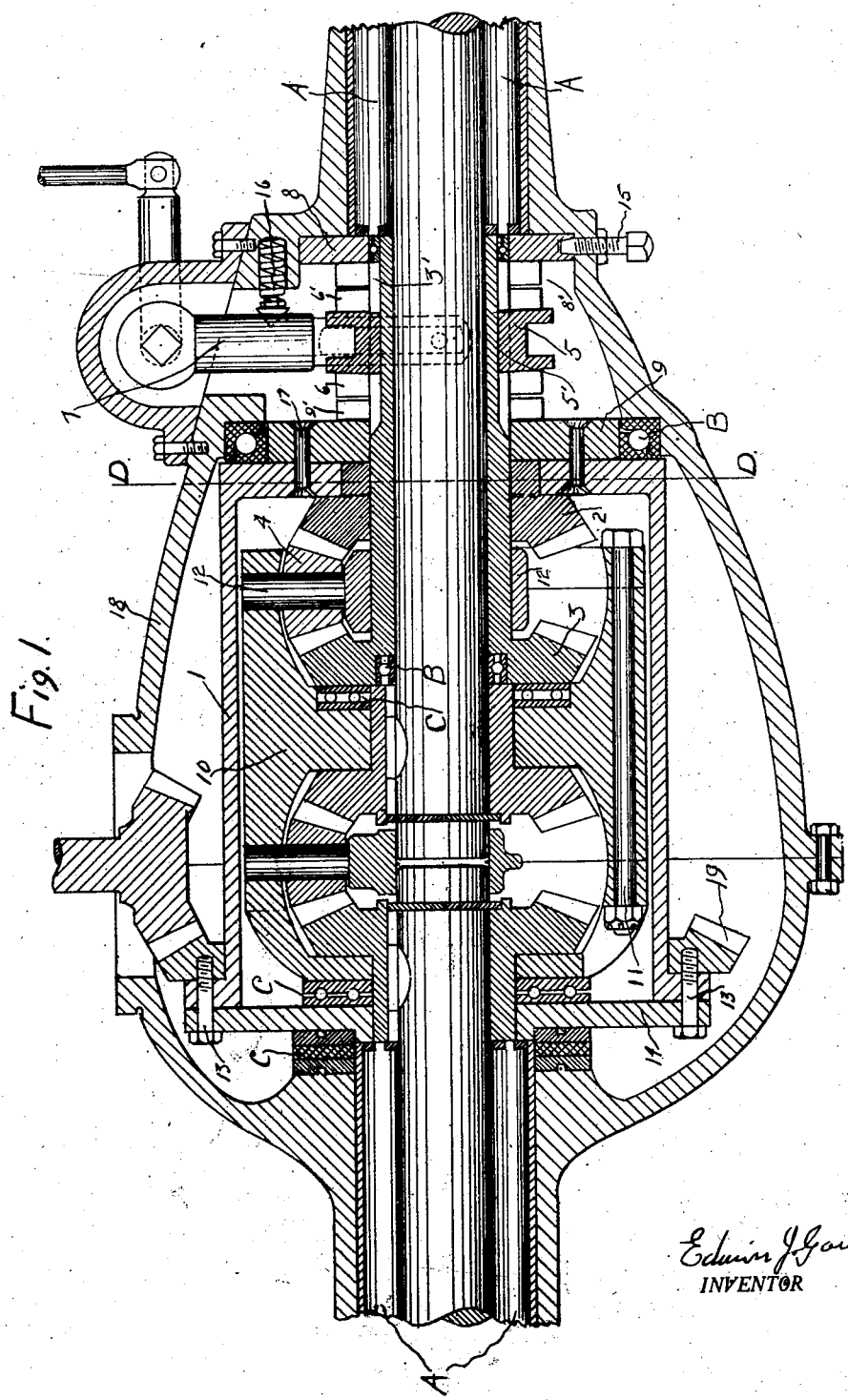
Figure 2:
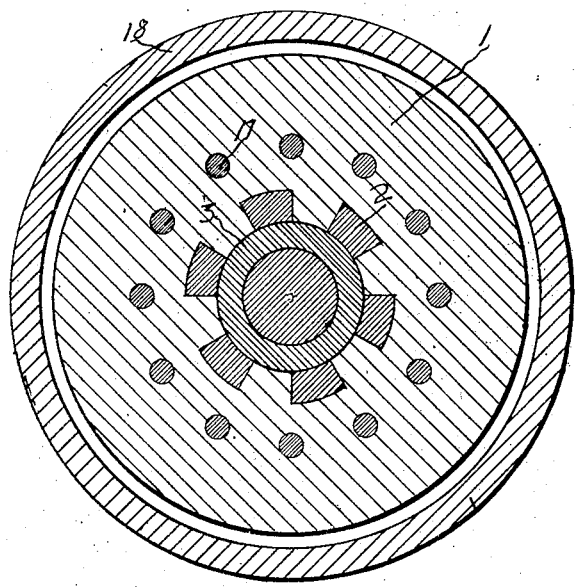
Figure 3:
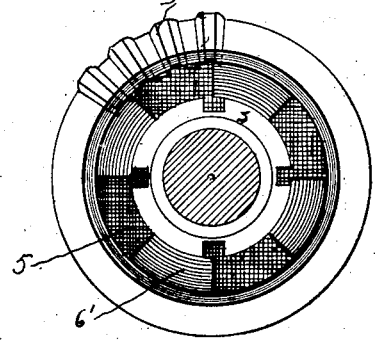

In the annexed drawings, Fig. 1 is a sectional view of the device, together with usual type of differential gear and the axles of an automobile. Fig. 2 is a vertical section at the line D D of Fig. 1. Fig. 3 is an end view of an axle section also showing gear 3, with its splined hub, and showing how the clutch member 5 is splined thereon with an elevation of the clutch shoulders 6 of the clutch member 5. Like numbers refer to like parts throughout the different views.

Referring more particularly the drawings, 1 is a hollow driving member attached to the master gear of the motor car, 2 is a bevel gear with its hub splined into the member 1. 3 is a bevel gear with an elongated hub extending from its toothed side thru bevel gear 2, 4 is a bevel pinion meshing with the bevel gears 2 and 3. 5 is a clutch member splined at 5' on to the hub of the bevel gear 3, 6 and 6' are clutch shoulders extending from either side of the member 5, 7 is a shifting fork for the purpose of moving the member 5, 8 is a stationary clutch member fastened to the housing 18 by the bolts 15, with its clutch shoulder 8', fitted to engage the shoulders of the member 5 and prevent it (5), together with the gear 3, from revolving, 9 is a member riveted to the hollow member 1 by the rivets 17, and also having clutch shoulders 9' to engage those of the member 5, 10 is a cage constructed integral with the differential cage the outer ends of which are united to it by the bolts 11, 12 is a spider with shafts supporting the bevel pinion 4, by which the differential cage is driven, 13 are bolts securing the master gear 19 to the driving member 1, 14 is a support fitting over the hub of one of the bevel differential gears and extending from it to support the driving member 1, for the purpose of holding the latter in perfect alignment. 16 is a spring secured between the housing 18 and the shifting member 7 to prevent the clutch 5 from remaining in a neutral position, 18 is the rear axle housing of an automobile.

The letter A indicates roller bearing wherever shown, C indicates thrust bearings, either, plain or ball, while B shows ball bearings that are calculated to take both lateral and thrust load.

In operation the power is applied to the master gear 19 by the driving pinion, and this rotates the hollow member 1, and the bevel gear 2 being splined into the member 1 moves with it, and when a reduced speed of the differential cage 10 is demanded the clutch member 5 is shifted until its projecting shoulders 6' engage with the clutch shoulder 8' of the member 8 which prevents rotation of the member 5, and also of the bevel gear 3, since the member 5 is splined into the forwardly extending hub of the bevel gear 3, this causes the bevel pinion 4 to travel around the non-rotating bevel gear 3 when the pinion 4 is driven by the bevel gear 2 which reduces the speed of the pinion 4 to one half of that of the bevel gear 2, and consequently drives the differential cage 10 through the shaft 12 at the same speed that pinion 4 is moving. When high speed is required the member 5 is shifted longitudinally on the hub of the bevel gear 3 and it is released from the clutch shoulders of the member 8 while the clutch shoulders on the opposite side of the member 5 are engaged with the clutch shoulders 9' thus locking the bevel gears 2 and 3 together when no relative movement can take place between the gears 2, 3 and 4 thus causing the differential cage to revolve at the same speed as the member 1 and the master gear.

The novelty of this type of reduction gear arises from the fact that the hub of one of the bevel gears—instead of projecting backwards from the teeth, as is usually the case—projects forward from the teeth and is continued through the opposite bevel gear forming a support to hold the opposed bevel gears rigidly in line whether movement is taking place relatively between them or not, and also allowing a clutch member to be mounted on the further extension of the forwardly projecting hub, with the same effect of rigidity and perfect alignment. It is also apparent with this combination, that the whole mechanism is held in alignment by the supporting member 14, and that there will be no extra strain on the driving bolts 13 securing the master gear.

I do not intend to restrict myself to any particular construction of parts, as herein disclosed, but reserve the right to make such changes, variations, and modifications, as come properly within the scope of the protection prayed.

Having thus described my invention, what I claim as new is:—

1. In an auxiliary transmission gear, the combination of a bevel gear with an extending hub, a second bevel gear mounted loosely on said extending hub, bevel pinions meshed with each of said bevel gears and mounted on spider shafts extending through a casing integral with the differential casing of a motor vehicle, a housing surrounding said differential casing and secured to the second named bevel gear, a master gear mounted on said housing and meshed with the drive pinion of a motor vehicle, means to prevent rotation of the first named bevel gear, to secure a speed reduction of the said differential casing, substantially as set forth.

2. The combination in an auxiliary transmission gear comprising a housing driven by the propeller shaft of a motor vehicle, a differential in said housing, of a bevel gear with an extended hub surrounding an axle shaft of the motor vehicle, a second bevel gear rigid with said housing and surrounding the hub of the first named bevel gear and revolvable thereon, a spider also revolvably mounted on the hub of the first named bevel gear, shafts extending from said spider into the differential casing, bevel pinions revolvably mounted on said spider shafts and meshed with both of the said bevel gears, means to prevent the first named bevel gear from revolving, for the purpose of driving the said differential casing at a reduced speed from that of the second named bevel gear by the spider shafts, through the action of the bevel pinions while the first named bevel gear is held non-revolvable, substantially as set forth.

3. In an auxiliary transmission gear a differential, a bevel gear having an extended hub, a plurality of bevel pinions intermeshed with first named bevel gear, a second bevel gear also intermeshed with said bevel pinions and facing the first named bevel gear, a cage surrounding the differential and extending over the before mentioned train of bevel gears, a shaft extending thru each of the said bevel pinions and into said cage, a driving housing attached to the second named bevel gear and in turn surrounding said differential cage, a supporting member attached to the end of said housing, a clutch member secured to the opposite end of said housing, a second clutch member splined slidably on the extending hub of the first named bevel gear, a third clutch member secured to a stationary axle housing, a shifting member grooved into the second named clutch member, a means to move said shifting member to cause the second named clutch member to be engaged with the first named clutch member, and alternately engaged with the third named clutch member.

In testimony that I claim the foregoing, I have hereunto set my hand in the presence of two witnesses, this 20th day of June, 1924.

EDWIN J. GOULD.

Witnesses:
JOHN H. HARRIS,
VICTOR B. SHORMAN.